United States Patent
Trigg

[11] 3,883,102
[45] May 13, 1975

[54] TIE-DOWN FOR TRAFFIC COUNTER HOSE
[75] Inventor: Harry E. Trigg, Hampton, Va.
[73] Assignee: International Transportation Service Company, Hampton, Va.
[22] Filed: Aug. 13, 1973
[21] Appl. No.: 387,739

[52] U.S. Cl............... 248/75; 403/291; 24/115 K; 24/115 R; 248/156; 85/28
[51] Int. Cl.................... F16g 11/00; G08g 1/00
[58] Field of Search..... 24/115 R, 115 K; 340/38 R; 248/75, 156, 76; 403/291; 135/15 PE; 116/65 P, 123; 85/28

[56] References Cited
UNITED STATES PATENTS

| 1,802,657 | 4/1931 | Kellems | 24/115 R |
| 2,073,364 | 3/1937 | Carr | 340/38 R |
| 2,525,890 | 10/1950 | Gage | 248/156 |
| 2,766,501 | 10/1956 | Kellems | 24/115 R |
| 3,033,502 | 5/1962 | Silver | 248/156 |
| 3,456,660 | 7/1969 | Borchardt | 135/15 PE |

FOREIGN PATENTS OR APPLICATIONS

| 694,633 | 9/1964 | Canada | 403/291 |
| 677,394 | 8/1952 | United Kingdom | 24/115 R |
| 1,028,350 | 5/1953 | France | 116/63 |

Primary Examiner—Bernard A. Gelak

[57] ABSTRACT

The free end of a pneumatic hose for a traffic counter is tied down to a pavement of a roadway by means of a Chinese finger trap swivelled to a piton driven into the pavement.

1 Claim, 4 Drawing Figures

PATENTED MAY 13 1975 3,883,102

TIE-DOWN FOR TRAFFIC COUNTER HOSE

OBJECTS

Heretofore various means have been tried, with limited success, to tie down the free end of the pneumatic hose of a traffic counter. Various nails and spikes have been driven into the pavement of a roadway and secured to the free end of a traffic counter hose, but, when the pavement becomes heated, the nails are either pushed or pulled sidewise by automobiles running over them or by the tension applied thereto by the pneumatic hose itself when automobiles run over it. The object now is to provide a tie-down which on the one hand will not damage the free end of the hose and on the other hand will not be dislodged. To this end, two well known elements are utilized, the first being a Chinese finger trap and the other being a piton to which the strands are swivelly connected. By this unique combination of the two elements, the free end of the hose is held in a manner that will not harm it when tension is applied to the hose, and a limited but certain freedom of movement is afforded through its connection with the piton.

These and other objects will be apparent from the following specification and drawings, in which.

Figure 1:
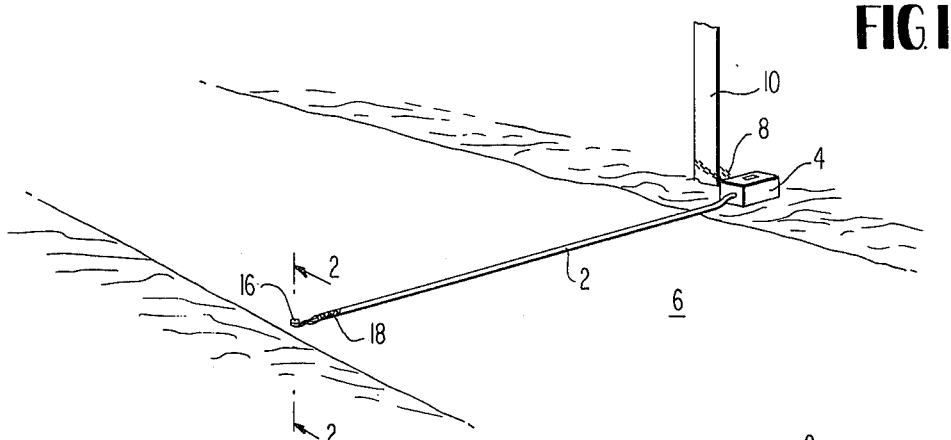
FIG. 1 is a perspective view showing the invention in typical use.
Figure 2:
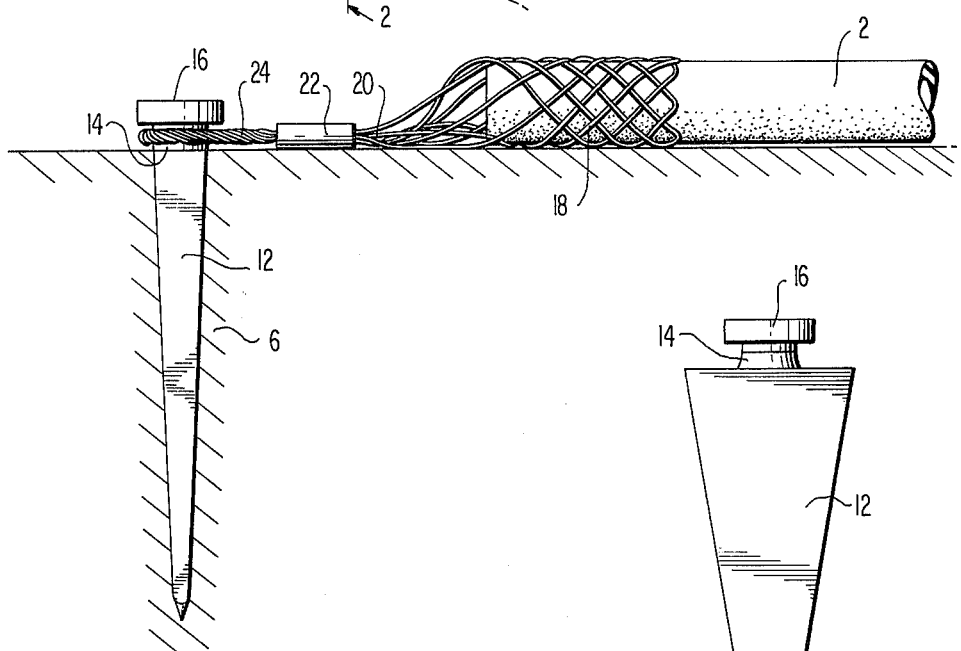
FIG. 2 is a cross section along the line 2—2 of FIG. 1 showing the details of the tie down.
Figure 4:
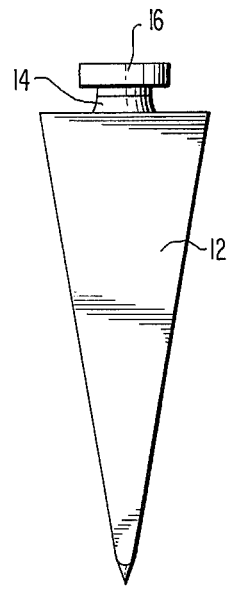
FIG. 4 is an end view of the piton per se.
Figure 3:
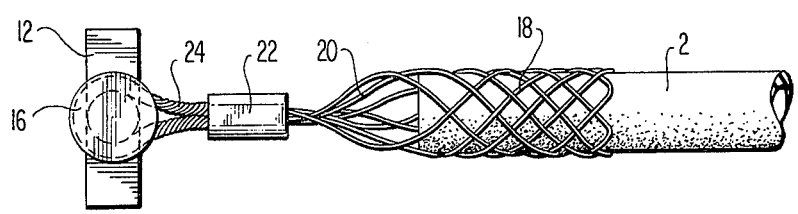
FIG. 3 is a plan view of the tie down as shown in FIG. 2.

Referring now to the drawings in which like reference numerals denote similar elements, a pneumatic hose 2 of a traffic counter 4 extends across a road pavement 6. As is customary, a traffic counter is anchored as by chain 8 to a post 10. Adjacent the side of the roadway opposite that upon which the traffic counter is disposed, a piton 12 is driven into the pavement. The piton is a generally flat, tapered spike on the upper end of which is a neck 14 surmounted by a head 16. In addition to the neck and head, the piton is of special shape to resist sidewise pull in soft asphalt. The body is flat, and triangular, with the wider end at the top so as to present maximum resistance to tipping sidewise when tension is applied to the neck. A Chinese finger trap 18 is engaged over the free end of the pneumatic hose 2. Such finger traps are well known for connecting to cables and ropes. As is usual, the strands 20 of the finger trap are bound together by a collar 22 and formed into a loop 24. Loop 24 is sized so that it will swivel freely on the piton neck 14, but will not pull free over the head 16 of the piton.

In operation, when vehicles run over pneumatic hose 2, the resultant tension will cause the finger trap 18 to engage all the tighter around the free end of the hose without damaging it, and such tension will not dislodge the piton.

I claim:

1. A tie down for the free end of a traffic counter hose comprising
   a piton adapted to be driven into the pavement of a roadway and comprising
      a body adapted to be driven into a roadway,
      a cylindrical neck on the top of said body surmounted by
      a cylindrical head,
   a Chinese finger trap engageable over a free end of said hose, said finger trap having
      strands formed with a loop, said loop engaging around said neck and being normally barred from dislodgement from said neck by said head save by manipulative distortion of the loop,
   said body being substantially flat and of generally triangular shape with a pointed lower end and a comparatively wide upper end from which said neck projects upwardly, the diameter of said neck being substantially equal to the thickness of the body and the diameter of the head being substantially greater than the diameter of the neck.

* * * * *